March 10, 1970     W. R. RICKEL     3,500,011
FILTER APPARATUS
Filed July 11, 1967     2 Sheets-Sheet 1
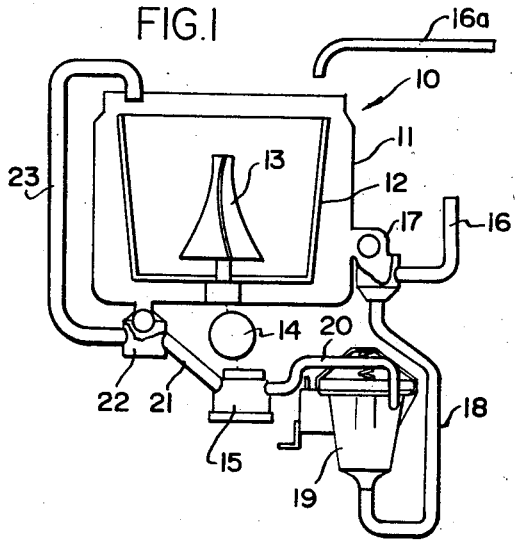
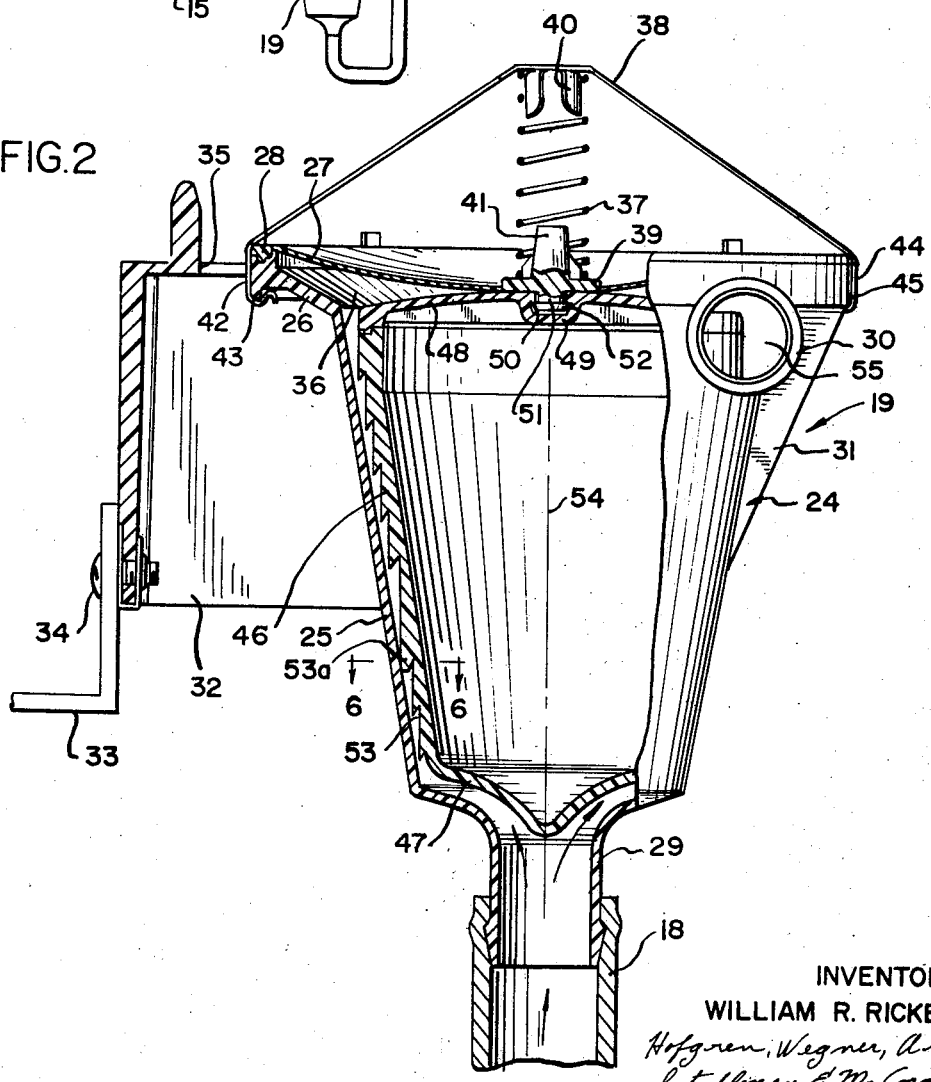
INVENTOR
WILLIAM R. RICKEL
BY     ATTORNEYS March 10, 1970   W. R. RICKEL   3,500,011
FILTER APPARATUS
Filed July 11, 1967   2 Sheets-Sheet 2
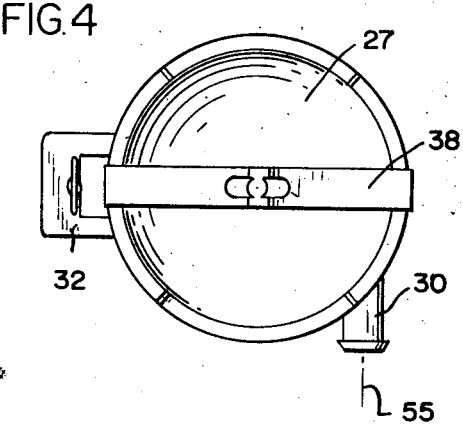
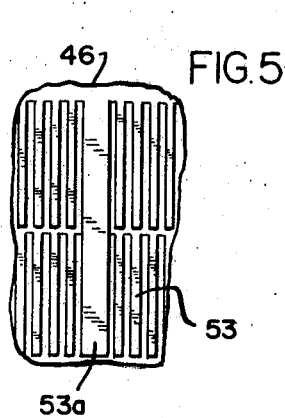
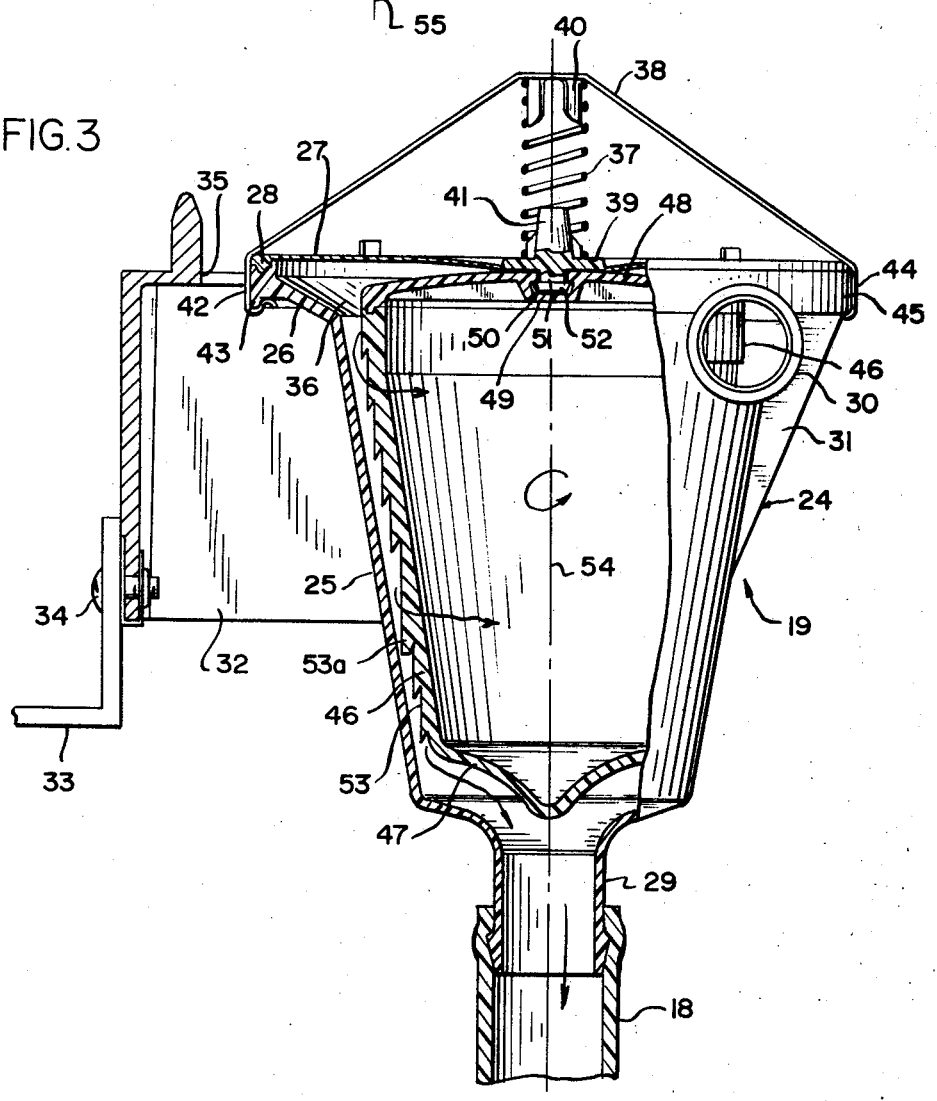

United States Patent Office 3,500,011
Patented Mar. 10, 1970

3,500,011
FILTER APPARATUS
William R. Rickel, St. Joseph, Mich., assignor to Whirlpool Corporation, a corporation of Delaware
Filed July 11, 1967, Ser. No. 652,618
Int. Cl. B01d 35/22, 33/02
U.S. Cl. 210—386                                10 Claims

ABSTRACT OF THE DISCLOSURE

A filter apparatus for use in an automatic washing machine and the like. The apparatus includes means for removing lint and similar foreign material from the wash water in a filtering operation and for delivering the filtered material to a drain line a wash-off operation, whereby the filter apparatus is self-cleaning.

---

This invention relates to filter apparatus and in particular to self-cleaning filter apparatus.

A particularly vexatious problem arises in washing clothing and the like in the need for filtering lint and similar foreign material from the washing fluid so as to prevent redeposition of such foreign material on the clothing by the recirculation of the washing fluid in the normal washing operation. Because of the substantial amount of such foreign material filtered from the washing liquid in a normal clothes washing operation, it is necessary to clean the filter from time to time thereby to prevent inoperativeness thereof as from clogging.

The present invention comprehends a filter apparatus having new and improved means for effecting such automatic self-cleaning thereof for maintained efficiency of filtering operation.

Thus, a principal feature of the present invention is the provision of a new and improved filter apparatus.

Another feature of the invention is the provision of such a filter apparatus provided with new and improved means for effecting self-cleaning thereof.

A further feature of the invention is the provision of such a filter apparatus having new and improved means for dislodging filtered material from the filter structure during a wash-off, self-cleaning operation.

Still another feature of the invention is the provision of such a filter apparatus having new and improved means for effectively maintaining a movement between spaced filtering members during the wash-off operation to provide an improved dislodging of filtered material therefrom into the wash-off fluid.

Yet another feature of the invention is the provision of such a filter apparatus having new and improved means for selectively rotatively carrying one filter member within a filter chamber defined by a cooperating filter housing for rotatively dislodging the filtered material therefrom during the wash-off operation.

A further feature of the invention is the provision of such a filter apparatus having new and improved means for utilizing the flow of the wash-off fluid to effect a desired material-dislodging movement of the filter member during the wash-off operation.

Still another feature of the invention is the provision of such a filter apparatus having new and improved means for causing the wash-off fluid to effect a rotation of the filter member for dislodging the filtered material therefrom, and to flow about the filter member in a helical path thereby to have an axial component of movement further serving to wash the filtered material from the filter member.

Another feature of the invention is the provision of such a filter apparatus having a new and improved yieldable wall portion on the chamber means for selectively disposing the filter member in a fixed filtering position and in a movable wash-off position.

A yet further feature of the invention is the provision of such a filter apparatus wherein the yieldable wall portion is arranged to have selective inward and outward over-center disposition and means are provided for biasing the wall portion to one of the over-centered dispositions.

Still another feature of the invention is the provision of such a filter apparatus of improved, simplified, economical construction.

In summary, the invention comprehends an improved self-cleaning filter wherein a filter member is selectively fixedly associated with a chamber means for effecting a filtering action and movably spaced therefrom for effecting a wash-off operation.

Other features and advantages of the invention will be apparent from the following description taken in connection with the accompanying drawing wherein:

FIGURE 1 is a schematic front elevation of a washing machine provided with a filter apparatus embodying the invention;

FIGURE 2 is an enlarged elevation of the filter apparatus with a portion thereof broken away in diametric section;

FIGURE 3 is a view similar to that of FIGURE 2, but with the filter apparatus arranged in a wash-off arrangement;

FIGURE 4 is a reduced top plan view thereof;

FIGURE 5 is a fragmentary side elevation of the vaned side wall of the filter member; and FIGURE 6 is a fragmentary horizontal section taken substantially along the line 6—6 of FIGURE 2.

In the exemplary embodiment of the invention as disclosed in the drawing, a washing apparatus generally designated 10 is shown to comprise a domestic clothes washing apparatus including a tub 11 within which is provided a basket 12 and an agitator 13. The agitator is driven by a suitable electric motor 14 which also drives a reversible circulating pump 15. Water is delivered into the tub 11 from a suitable supply (not shown) through a duct 16a. After a suitable quantity of wash water is delivered into the tub 11, a washing action is effected by a recirculation of this water (having suitable cleaning agents added thereto as desired) by means of pump 15. During such recirculative washing, pump 15 acts to draw the wash water outwardly through a check valve 17 and a duct 18, through the filter apparatus 19 wherein lint and other foreign material is filtered from the wash water. The filtered washwater then passes on through a duct 20, pump 15, a duct 21, a drain-control valve 22, and an inlet duct 23 which opens into the upper portion of the tub 11.

As indicated briefly above, the invention comprehends the self-cleaning of the filter apparatus 19 to maintain the efficiency of operation thereof and effectively eliminate the need for manual servicing. To this end, the filter apparatus is arranged to utilize the water flow action in the drain cycle of the washing machine 10. Thus, in the drain cycle, the pump 15 is reversed so as to draw water from the bottom of the tub 11 through the drain control check valve 22 and duct 21 and discharge the water through duct 20, filter apparatus 19, duct 18, and through check valve 17 and a duct 16 to a siutable drain (not shown). The present invention comprehends an improved arrangement of filter apparatus 19 providing an improved self-cleaning operation during such a drain cycle.

More specifically, referring now to FIGURES 2 through 6, filter apparatus 19 includes a body member 24 having a frusto-conical, downwardly narrowing mid-portion 25 provided with an upper, outturned flange 26. The upper, open end of body member 24, consisting of mid-portion 25 and outturned flange 26, is sealingly closed by a flexible cover 27 having an outer flange portion 28 seating on the distal body member flange 26. The lower end of the body member is defined by a reduced diameter portion 29 adapted to have the end of duct 18 sealingly connected thereto. A tubular connector 30 is provided on the body member 24 adjacent the upper end thereof with its axial extent chordal to the frusto-conical body member closely subjacent the cover 27 and intersecting the flange portion 26.

The body member 24 is provided with reinforcing gussets 31 and a mounting bracket portion 32 for removable mounting of the filter apparatus 19 on a suitable bracket, such as bracket 33 of the washing machine 10, as by screws 34. The bracket 32 is provided with an upper recess 35. The cover 27 comprises a flexible diaphragm-like member which is selectively dispositioned in the opposite over-centered arrangements of FIGURES 2 and 3 as a function of the water pressure within the chamber 36 defined by the body member 24. The cover is biased to the downward over-centered position of FIGURE 2 by a coiled spring 37 acting between a retainer strap 38 and a center boss 39 on the cover. The strap 38 may be provided with a spring centering clip 40 and the boss 39 may be provided with an upstanding post 41 for retaining the spring in compressed relationship therebetween. The retainer 38 includes a first clip end 42 extending through the opening 35 and having releasable interlocked association with a latch portion 43 on the body member flange 26. The opposite end of the strap retainer 38 similarly defines a clip 44 having interlocked relationship with a corresponding latch 45 diametrically opposite latch 43.

As best seen in FIGURES 2 and 3, filter apparatus 19 further includes a generally frusto-conical filter member 46 movably disposed within the chamber 36. More specifically, filter member 46 comprises a hollow, downwardly narrowing, frusto-conical member having a bottom wall 47 and a top wall element 48. Top wall element 48 is provided centrally with a pivot retainer 49 defined by an undercut recess 50 receiving a pivot carrier 51 having a lower radially enlarged disc portion 52 rotatively retained in the recess 50 for coaxially pivotally carrying the filter member 46 on the cover 27. The external side wall of the filter member 46 is provided with a plurality of longitudinally extending vanes 53 having a saw-toothed configuration in transverse section, as seen in FIGURES 2 and 3, and extending generally parallel to the axis 54 of the filter member 46, as shown in FIGURES 2, 5 and 6. The external side wall of filter member 46 is further provided with a circumferentially spaced row of longitudinally extending ribs 53a having approximately twice the longitudinal extent of vanes 53. Due to their greater length, the lower portion of ribs 53a engage the inner surface of mid-portion 25 prior to the engagement of vanes 53. This is effective in spacing the lower portion of vanes 53 a short distance away from the inner wall of mid-portion 25 to thereby prevent filter member 46 from jamming within body member 24 when in the down position. As best seen in FIGURES 2 and 3, the external radius of the filter member 46 adjacent the top wall 48 is approximately equal to the spacing of the chordal axis 55 of the connector 30 from the filter member axis 54 whereby water flowing inwardly and outwardly through the connector 30 flows generally tangentially to the upper portion of the filter member in this portion of the chamber 36.

The filter apparatus 19 is extremely simple and economical of construction with the body member 24, cover 27, and filter member 46 being formed of a suitable material such as plastic.

In operation, the recirculated wash water passes upwardly through the filter apparatus 19, as shown in FIGURE 2, whereby the saw-toothed vanes 53 trap material such as lint to thereby filter the water pumped through the duct 23 into the tub 11. The relatively low pressure of the liquid in the upper portion of chamber 36 as a result of the pumping therefrom by the pump 15 causes the flexible cover 27 to be deflected downwardly by the spring 37 to the filtering position shown in FIGURE 2 whereby lint and similar foreign matter in the wash water is removed therefrom by the screening action of the saw-toothed vanes 53. During the drain cycle of operation, pump 15 is suitably operated at a higher speed to pump the wash water from the bottom of tub 11 through valve 22 and into the upper portion of chamber 36 through connection 30. As discussed above, the flow into chamber 36 is tangential to the upper end of the filter member 46 and continues helically down around the filter member as illustrated by the arrows in FIGURE 3 to pass outwardly from the lower end 29 of the filter body member 24 through the ducts 18 and 16 to a suitable drain.

The increased pressure of the incoming wash water being drained from the tub by pump 15 overcomes the spring 37 to urge the cover 27 upwardly and thereby disengage the vanes 53 from the filter body wall 25. The tangential and downward helical flow of the wash water thus effects an improved wash-off functioning wherein the filter member 46 is rotated on the pivot 51 coaxially within the chamber 36 to throw off collected filtered material and facilitate the wash-off of the filter member vanes 53 by the flow of the wash water downwardly therepast.

The spinning of the filter member about its axis 54 causes all portions thereof to pass through the various paths of maximum wash water flow downwardly through the chamber 36 thereby assuring effectively positive removal of the collected filtered material. Further, the generally helical flow of the wash water may have an improved wash-off action in having a component of movement laterally to the vane extent wherein the undercut saw-toothed vanes are washed in an improved manner further assuring substantial complete removal of the filtered material from the filter.

As indicated above, the filter member and filter body structures may be molded of a plastic material for simplified economical construction. Further, a relatively smooth surfaced plastic may be employed, such as polypropylene, etc., to facilitate wash-off of the collected material from the surfaces of the filtering elements. Still further, the filter apparatus as described herein may be mounted not only in the position shown in FIGURE 1, but in any position (i.e. sideways, inverted, etc.), since its operation does not in any way depend on gravitational forces.

While I have shown and described one embodiment of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. Filter apparatus comprising: first wall means defining a filter chamber; second means in said chamber for cooperating with said wall means in a stationary juxtaposed position to define a filtering flow path therebetween through which fluid is flowed to be filtered; means for selectively disposing said second means in a spaced position relative to said first wall means to define a wash-off flow path therebetween through which wash-off fluid is flowed; and third means supporting said second means for movement relative to said first wall means while in said spaced position whereby movement of said second means in said spaced position facilitates dislodging of filtered material therefrom into said wash-off flow path.

2. The filter apparatus of claim 1 wherein said third means comprises means for rotatively supporting said second means.

3. The filter apparatus of claim 1 wherein said wall means includes a yieldable portion and said third means includes means for rotatively carrying said second means on said wall portion.

4. The filter apparatus of claim 1 wherein said third means comprises means for rotatively carrying said second means in said chamber and means for causing the flow of wash-off fluid to effect rotation of said second means.

5. The filter apparatus of claim 1 wherein said third means comprises means for rotatively carrying said second means in said chamber and means for introducing wash-off fluid into said chamber substantially tangentially to said second means for rotating said second means.

6. The filter apparatus of claim 1 wherein said third means comprises means for rotatively carrying said second means in said chamber and means for causing wash-off fluid to flow helically about said second means in said wash-off flow path for rotating said second means.

7. The filter apparatus of claim 1 wherein said wall means includes a yieldable portion and said third means includes means for rotatively carrying said second means on said wall portion, said wall portion being constructed to have selective inward and outward over-centered disposition, and spring means are provided for biasing said wall portion to one of said dispositions.

8. The filter apparatus of claim 1 wherein said wall means includes a yieldable portion and said third means includes means for rotatively carrying said second means on said wall portion, said wall portion being constructed to have selective inward and outward over-centered disposition, and spring means are provided for biasing said wall portion to said inward disposition, said second means being disposed in said juxtaposed position relative to said wall means when said yieldable wall portion is in said inward disposition.

9. The filter apparatus of claim 1 wherein said third means includes a plurality of vane elements on said second means extending into said wash-off flow path.

10. The filter apparatus of claim 1 wherein said first and second means are formed of plastic and said third means are integral therewith.

References Cited

UNITED STATES PATENTS

| | | | |
|---|---|---|---|
| 3,338,416 | 8/1967 | Barry | 210—354 X |
| 3,363,771 | 1/1968 | Walters | 210—360 |
| 3,429,444 | 2/1969 | Spiegel et al. | 210—356 |

REUBEN FRIEDMAN, Primary Examiner

J. W. ADEE, Assistant Examiner

U.S. Cl. X.R.

210—391